J. FRAZER & J. AUSTIN.
Velocipede.
No. 91,734.
2 Sheets—Sheet 1.
Patented June 22, 1869.
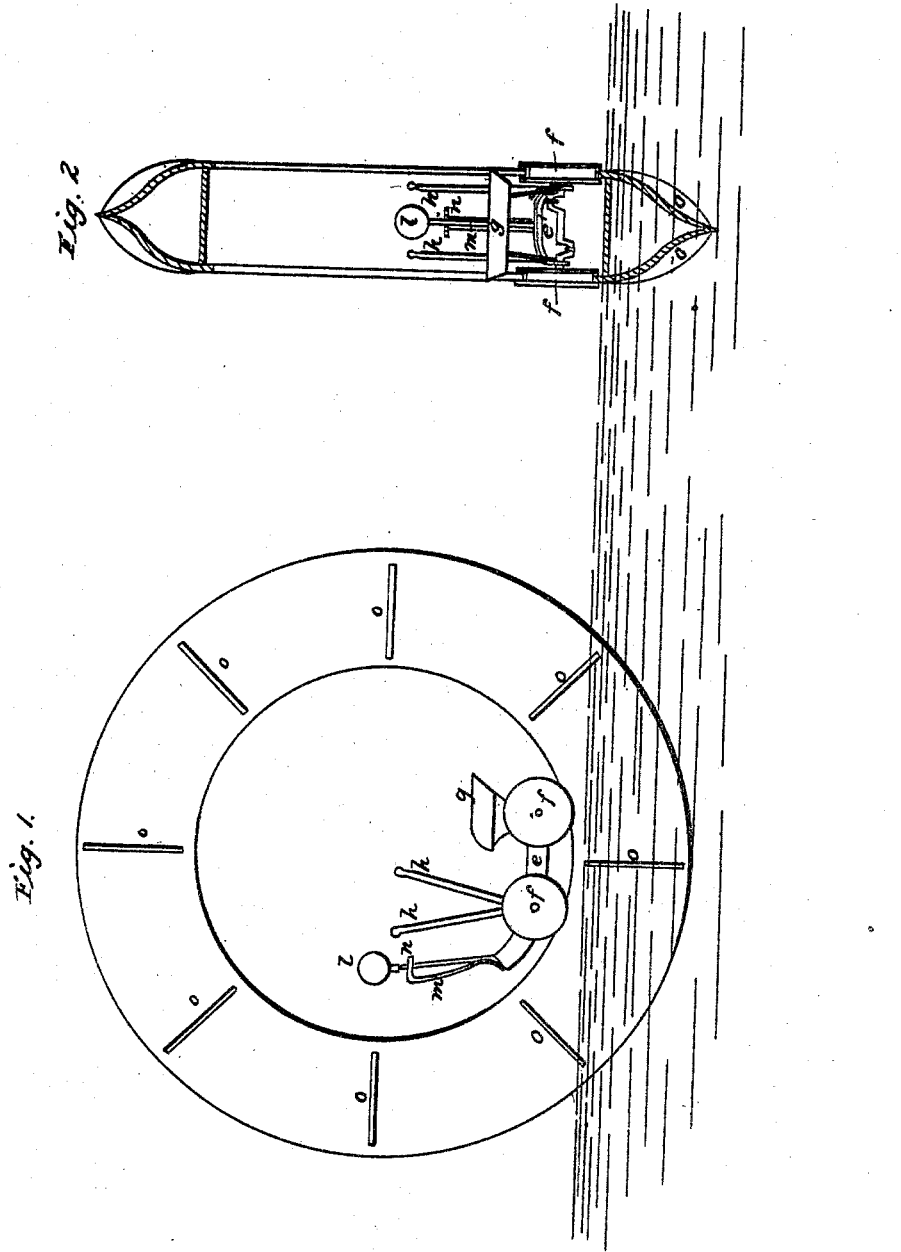

J. FRAZER & J. AUSTIN.
Velocipede.
No. 91,734.
2 Sheets—Sheet 2.
Patented June 22, 1869.
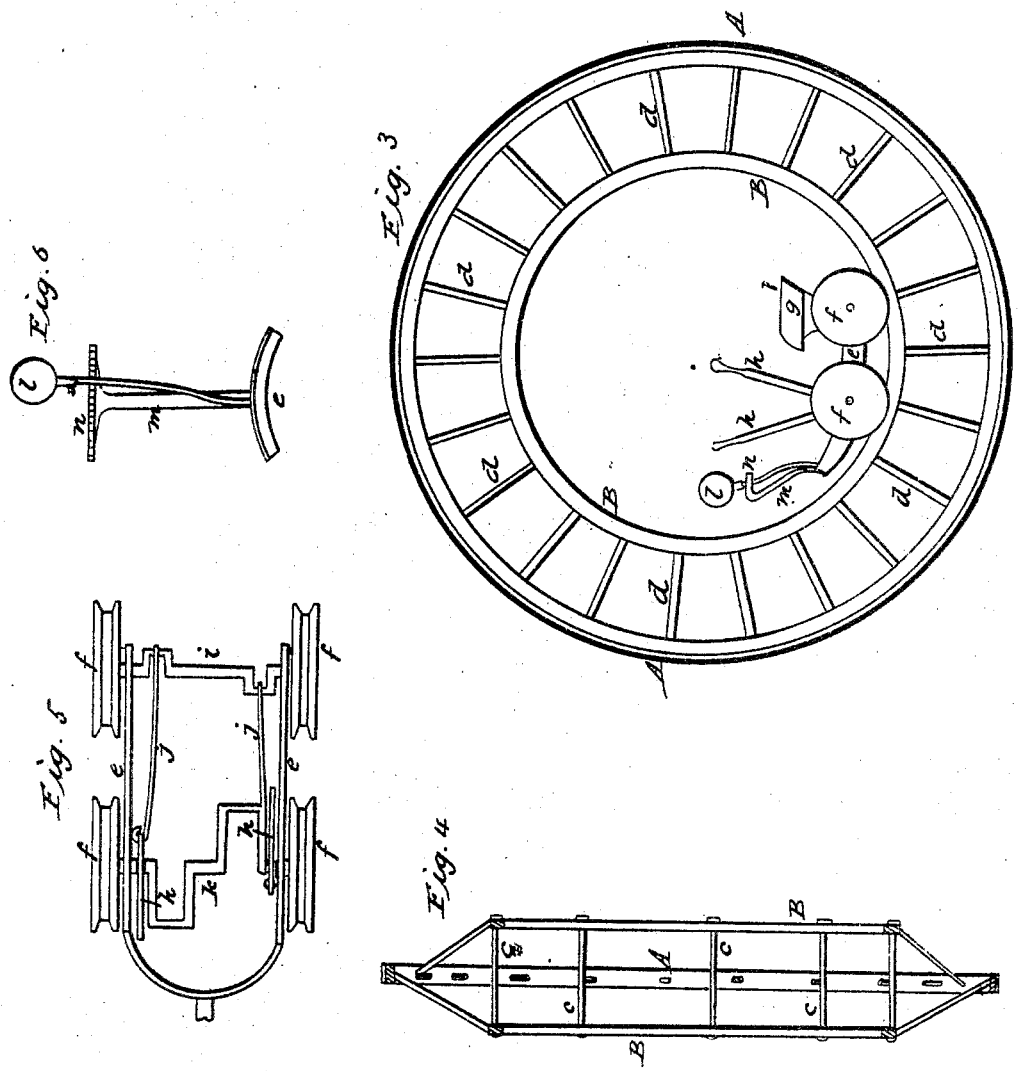

United States Patent Office.

J. FRASER AND JONATHAN AUSTIN, OF NEW YORK, N. Y.

Letters Patent No. 91,734, dated June 22, 1869.

---

IMPROVEMENT IN VELOCIPEDE.

---

The Schedule referred to in these Letters Patent and making part of the same.

---

*To all whom it may concern:*

Be it known that we, J. FRASER and JONATHAN AUSTIN, both of the city, county, and State of New York, have invented a new and improved Unicycle Velocipede; and we do hereby declare that the following is a full and exact description thereof, reference being had to the accompanying drawings, in which—

Figure 1 is a side elevation of our improved velocipede, as constructed for aquatic use;

Figure 2 is a vertical section of the same;

Figure 3 is a side elevation of our velocipede, as constructed for use upon land; and Figure 4 is a vertical section of the annular wheel, a portion of the spokes being omitted.

Figure 5 is a plan view of the propelling-car, the seat and guiding-apparatus being removed.

Figure 6 is a front elevation of the steering or guiding-device attached.

Like letters indicate corresponding parts in all of the figures.

It is the object of our invention to produce a velocipede of such construction as to especially adapt it to use by ladies, and also which will be capable, by slight modifications in its construction, of use upon water, as still lakes, ponds, &c., thus affording a variety of diversion and enjoyment, combined with healthful physical exercise.

The nature of our invention consists essentially in the employment of an annular wheel or rim, constructed as hereinafter described, and arranged to receive in its interior or central space, an independent car, for the rider, having propelling-mechanism, operated by the feet or hands, or by both conjointly, the propulsion being effected by moving the weight of the rider and the propelling-mechanism forward of a line perpendicular with the imaginary axis of said annular wheel, thereby causing its rotation along the ground, or other medium on which it rests. Said annular wheel to be made of light skeleton form, for use exclusively on the land, but when designed for aquatic use, or for either purpose alternately, to be formed by enclosing the sides, so as to form an annular trunk, and affixing ribs or braces to the external sides.

It also consists in the device for governing and directing the course of the same, whether employed on land or water.

In carrying our invention into practice, we prefer to use, for land-purposes, a single external rim, A, with two rings of lesser diameter, B B, arranged concentrically within the former, at unequal distances each side of its plane.

The two interior rings are of equal diameter, and connected together by transverse pieces or rods $c$ $c$, and with the outer rim by the converging radial spokes $d$ $d$, uniting the three firmly together, or by any other mode of construction which combines strength and lightness.

Thus constructed, the two inner rings B B form a circular track or railway, and on this we place a propelling-car, having grooved wheels $f f$ running upon the track so formed.

These wheels have their bearings in a suitable frame, $e$ $e$, which supports a seat, $g$, for the rider, which is preferably situated over the rear wheels, and for ladies' use, should be broad enough to project over and prevent their dress coming in contact with the wheels.

In addition thereto, suitable guards may be attached to the frame, surrounding, or nearly enclosing both pairs of wheels, with which provision a lady may use our velocipede while arrayed in the customary style of female dress, without danger of entanglement, or of soiling the same.

Motion may be imparted to the car by any suitable mechanism, but we prefer to employ that which will enable both the feet and hands to be employed together or separately.

We therefore construct the axles of the car with double cranks, and connect with one, (preferably the rear one,) a pair of upright hand-levers, $h$ $h$.

These have their fulcra on the forward axles, and are connected with the cranks of the rear axle $i$, (see in fig. 5,) by the usual connection-rods $j$ $j$.

The forward axle $k$ is also provided with double cranks, which are operated by the feet of the rider.

The car being put in motion by the rider, in advancing, ascends the constant incline of its circular track, causing the annular wheel to revolve or roll upon the ground, or other medium on which it rests, the equilibrium being more easily maintained by the rider than with the ordinary bicycle, in consequence of the weight being below the axis of the annular wheel, and near the ground, instead of above.

On this account it is better adapted to ladies, and timid riders of both sexes, while if accidentally overturned, no harm is likely to occur to the occupant, as she (or he) may simply step off the car on the opposite side from which it falls, alighting on the feet without injury, and without being entangled with or thrown under the vehicle.

The device for guiding or controlling the direction is attached to the frame $e$, of the car, at its forward end, and consists of a ball or weight, $l$, supported at an elevation which may be equal to but not above the axis of the annular wheel.

The supporting-rod is jointed or flexible, to admit of the position of the ball being adjustable laterally in either direction, from the longitudinal centre, and a simple arrangement for holding it in the required position, consists of the standard $m$, with a cross-head, $n$, provided with a series of notches, to receive and retain the ball-rod, but allowing it to be readily changed at the will of the rider. This result may be effected in various ways.

It will be seen that when the ball-weight is in a position corresponding with the central plane of the unicycle, the latter will be perfectly balanced, and will, in moving, advance in a direct line, maintaining a perpendicular position; but if the ball be moved to either side, the preponderance of weight is in that direction, and the course of the vehicle will be varied accordingly; and as its position is nearest the forward part, the wheel obeys this influence of gravitation with alacrity, the ball leading the machine, as it were.

By this simple and philosophical means, perfect control is had, with the greatest ease to the rider.

The only change of construction necessary to adapt our unicycle to aquatic service, is to construct the annular wheel in such a manner as to be water-tight.

This is most readily and cheaply done by making it of sheet-metal, as shown in figs. 1 and 2.

In this form, it constitutes an annular trunk, filled with air, which renders it so buoyant that it will not sink if overturned, and will maintain a considerable load in any position.

The joint at the periphery is carried out sharp, to form a suitable keel, the sides being curved to conform to the most approved shape in machine-engineering.

Its annular form secures great strength with lightness of material, and additional stability is obtained by applying the radial webs or ribs $o$ $o$ to the outer sides, which serve a special purpose, as paddles, to prevent the slip of the hull by the resistance of the water.

Movable ballast, as mercury, or shot, may be carried in the annular wheel, if required.

The same car is used on the interior track, and the same mode of propulsion as for land, the effect being a rapid but easy and noiseless gliding over the surface of still water, making it a fascinating means of recreation in hot weather, on rural lakes, and other sheets of water.

The same steering-device answers admirably for nautical use; and by the slight modification of making the keel-edge broad, and strong enough to sustain the requisite weight on the ground, the same apparatus may be used either for land or water.

The land-unicycle may be made with the outer rim double, if preferred.

The diameter of the external rim of the unicycle may vary according to the size of the person, but six to six and one half feet will be found most suitable for adults.

A miniature size, having the car provided with a spring and clock-work, for automatic propulsion, with a doll occupying the seat, forms an amusing adaptation of the invention as a toy, which, by the guiding-device, may be set to move continuously in a circle around the floor of a room, or upon a table, until the motive-power is expended.

What we claim as our invention, and desire to secure by Letters Patent, is—

1. A unicycle, formed by the combination of a single narrow tread and a broad rim, the latter being supported on the former, through the medium of diverging spokes, constituting a triangular frame to bear the double track, substantially as set forth.

2. The unicycle, constructed with double tracks, supported on a closed winged apartment, forming an annular trunk, which terminates in a keel, substantially as and for the purpose described.

3. The guiding-device, consisting of the adjustable weight or ball, operating substantially as set forth.

4. A unicycle, consisting of an annular wheel, having a double bearing rim, B, propelling-car, with hand and foot-levers, and a guiding-device, when constructed and operating as described.

In witness whereof, we have hereunto signed our names, in the presence of two subscribing witnesses.

J. FRASER.
JONA. AUSTIN.

Witnesses:
 KATE V. JONES,
 ROLLIN GERMAIN.